United States Patent [19]

Sasaki

[11] Patent Number: 5,033,428
[45] Date of Patent: Jul. 23, 1991

[54] SAFETY SYSTEM FOR ENGINE OVERTURNING

[75] Inventor: Asao Sasaki, Chiba, Japan

[73] Assignee: Fuji Jukogyo Kabushiki Kaisha, Tokyo, Japan

[21] Appl. No.: 548,870

[22] Filed: Jul. 6, 1990

[30] Foreign Application Priority Data

Jul. 14, 1989 [JP] Japan ................................. 1-82742

[51] Int. Cl.$^5$ ............................................. F02B 77/68
[52] U.S. Cl. ........................ 123/198 D; 123/198 DC
[58] Field of Search .... 123/198 D, 198 DB, 198 DC; 180/282, 283, 284

[56] References Cited

U.S. PATENT DOCUMENTS

| 2,192,262 | 3/1940 | Griesedieck | 123/198 DC |
| 4,011,848 | 3/1977 | Coddington | 123/198 DB |
| 4,653,445 | 3/1987 | Book et al. | 123/198 D |
| 4,741,306 | 5/1988 | Watanabe et al. | 123/198 DB |

Primary Examiner—Noah P. Kamen
Attorney, Agent, or Firm—Beveridge, DeGrandi & Weilacher

[57] ABSTRACT

A safety system against engine overturning contains an inclination sensor for detecting an engine inclination and transmitting a signal representing the engine inclination and a self-hold device operatively connected to the inclination sensor. The self-hold device determines an inclined condition of the engine in response to the signal from the inclination sensor and transmits and holds an engine stopping signal in a case where the detected engine inclination exceeds a preliminarily set allowable inclination. The operation of the engine is stopped in response to the engine stopping signal from the self-hold device. The driving condition of the engine and a fuel pump are determined and controlled by driving condition determining device serving to drive the fuel pump when an engine speed exceeds a preliminarily set reference value while to stop the fuel pump when the engine stopping signal is transmitted from the self-hold device.

9 Claims, 3 Drawing Sheets

SAFETY SYSTEM FOR ENGINE OVERTURNING

BACKGROUND OF THE INVENTION

The present invention relates to a safety system for an engine against overturning and for stopping the engine as well as a fuel pump when the engine is inclined at a greater angle than an allowable angle.

Construction equipment or machine such as small sized roller or a small sized snowplow equipped with an industrial utility engine are generally provided with an inclination sensor for detecting an inclination of the engine greater than a predetermined angle and for causing an alarm or for temporarily stopping the operation of the engine.

Such an alarm or temporarily stopping the engine preliminarily indicates that the engine may be overturned. However, since the weight balance of the construction equipment is usually instable, the equipment or machine may be likely to be overturned on inclined ground. There will be insufficient time between the alarm and the actual overturning and, hence, it may be difficult for workers to take necessary procedure to prevent the machine from overturning before it is overturned.

Japanese Utility Model Laid-open Publication No. 59-40573 discloses a safety control device wherein the operation of a fuel pump is stopped at a time when a certain abnormal impact applied to a vehicle or a machine body is detected to cut off the fuel supply to the engine thereby preventing a secondary disaster such as a fire caused by the overturning of the engine. However, the safety control device describe above does not operate to cut off the fuel supply until an abnormal impact is detected, so that it may be difficult to quickly respond to the overturning and to effectively avoid the overflow of the fuel in the course of overturning.

SUMMARY OF THE INVENTION

An object of the present invention is to substantially improve the defects encountered in prior art techniques described above and to provide a safety system against engine overturning which is capable of effectively avoiding a secondary disaster after the overturning of the engine.

This and other objects can be achieved according to the present invention by providing a safety system for overturning of an engine with a fuel pump, comprising inclination detecting means for detecting an engine inclination and for transmitting an inclination signal, self-hold means responsive to the inclination signal for determining an inclined condition of the engine and for transmitting and holding or maintaining an engine stopping signal when the inclination exceeds a preliminarily set allowable inclination, engine stopping means responsive to the engine stopping signal for stopping an operation of the engine and driving condition determining means responsive to the engine stopping signal for stopping operation of the fuel pump.

According to the safety system for engine overturning described above, the inclined condition of the engine is first determined in response to the output signal from the inclination sensor. In the determination, when the engine inclination exceeds the preliminarily set allowable inclination, the engine stopping signal is generated and the output condition of the engine stopping signal is maintained. When the engine operation stopping signal is generated, the operation of the engine is stopped. When the engine speed exceeds the preliminarily set reference speed, the fuel pump is driven by the driving condition determining means, which, however, stops the operation of the fuel pump when the engine stopping signal is generated from the self-hold means. Accordingly, when the engine is inclined at a greater angle than an allowable angle, the operation of the engine as well as the fuel pump is immediately stopped and the stopped condition can be held, thereby effectively preventing the secondary disaster in case of overturning the engine.

A preferred embodiment of the present invention will be understood from the following detailed description referring to the accompanying drawings.

DETAILED DESCRIPTION OF THE PREFERRED EMBODIMENTS

Figure 1:
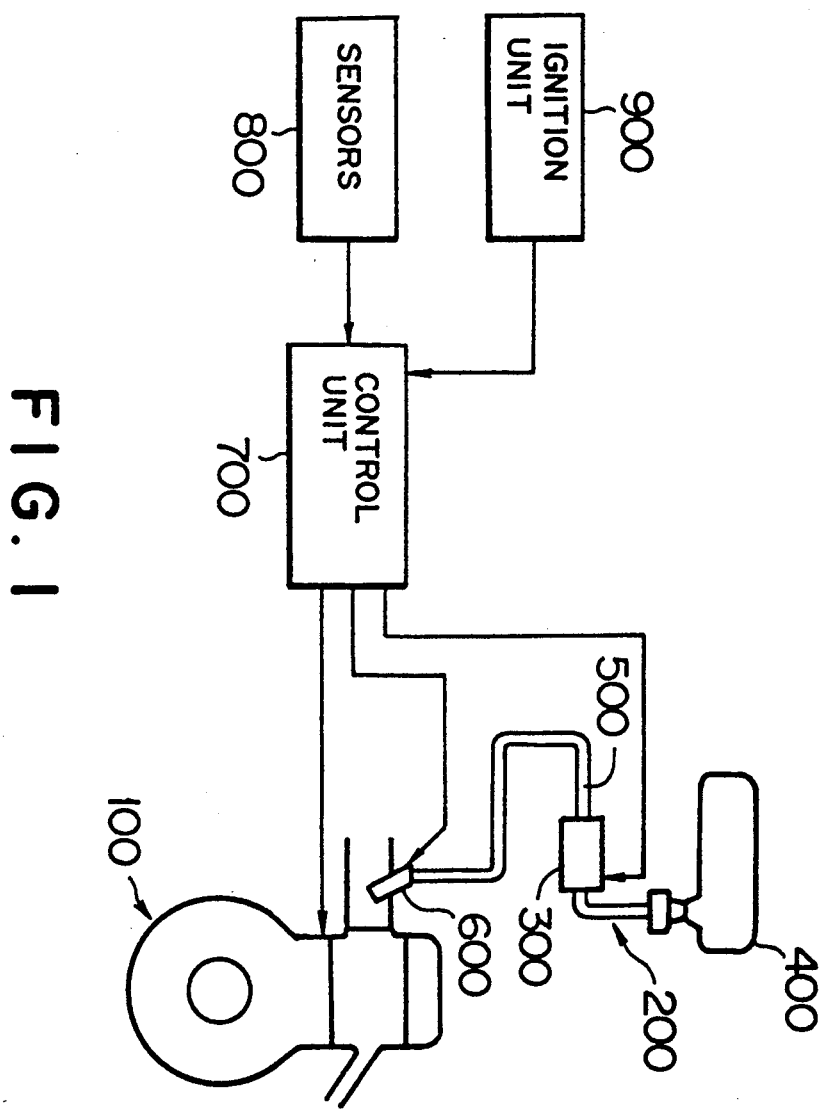
FIG. 1 is a schematic view showing an arrangement of a safety system for an engine unit according to the present invention.

FIG. 1 is a schematic view showing an arrangement of the safety system for an engine unit according to the present invention. Referring to FIG. 1, a fuel supplying unit 200 is disposed for an engine unit 100 and is provided with a fuel pump 300. Fuel in a fuel tank 400 is supplied to an injector 600, then to the engine unit 100 by the fuel pump 300 through a fuel supply pipe 500. The driving conditions such as engine speed of the engine unit 100 and the operation of the fuel pump 300 are controlled by a control unit 700 in response to output signals from respective sensors 800 including a sensor for detecting an inclination of the engine unit 100. An ignition unit 900 is also connected to the control unit 700.

Figure 2:
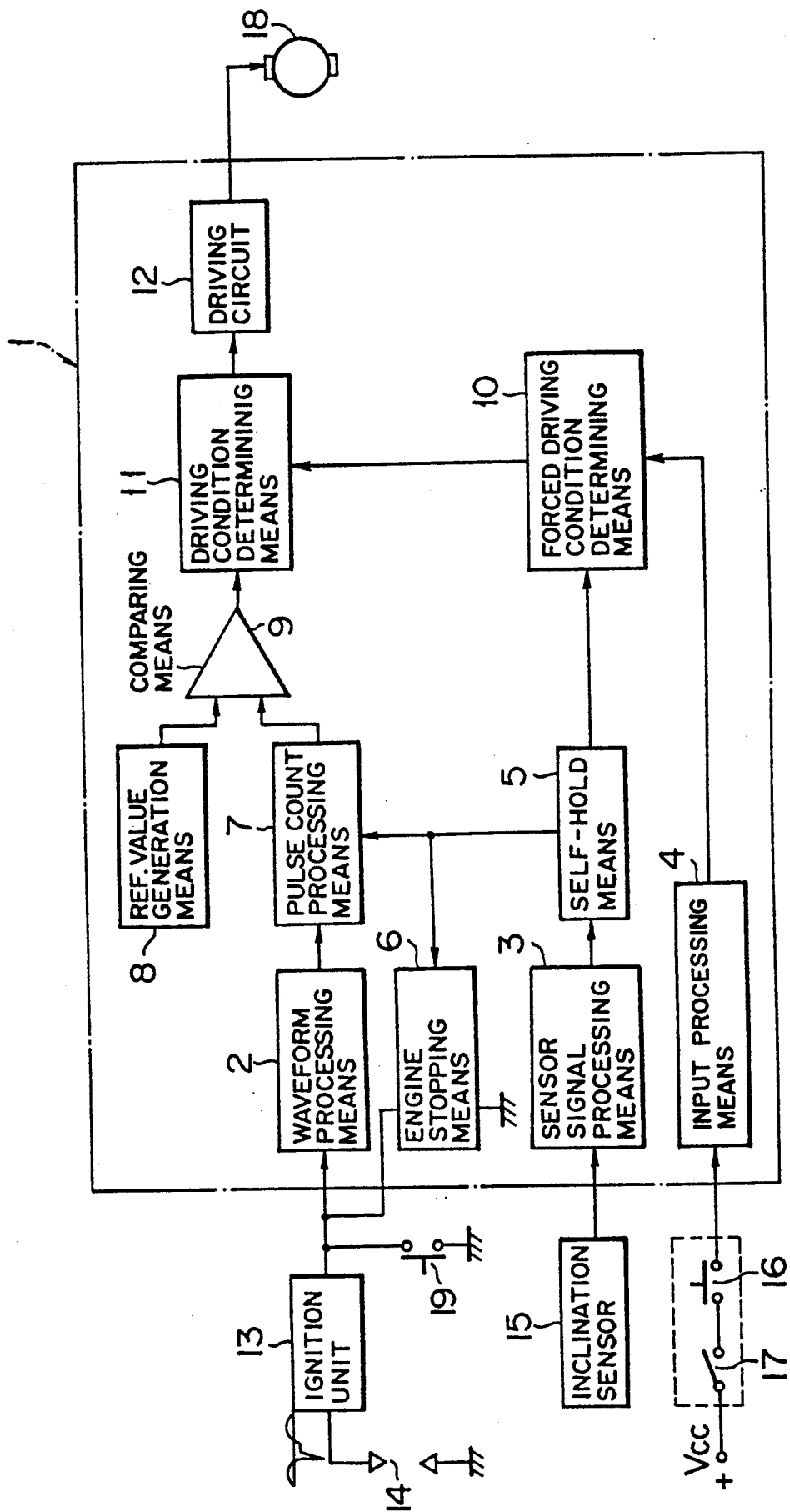
FIG. 2 is a block diagram of a safety system for engine overturning according to the first embodiment of the present invention.

FIG. 2 is a block diagram representing the first embodiment of the safety system against overturning according to the present invention incorporated in the arrangement shown in FIG. 1.

Referring to FIG. 2, a control unit 1 (equivalent to 700 in FIG. 1) of the safety system is composed of waveform processing means 2, sensor signal processing means 3, input processing means 4, self-hold means 5, engine stopping means 6, pulse count processing means 7, reference value generation means 8, comparing means 9, forced driving condition determining means 10, driving condition determining means 11 and a driving circuit 12.

A primary side of an ignition coil in an ignition unit 13 (900 in FIG. 1) is connected to the waveform processing means 2 and a secondary side of the ignition coil in the ignition unit 13 is connected to an ignition plug 14. The sensor signal processing means 3 is connected to an inclination sensor 15 (800 in FIG. 1), for detecting the inclination of the engine, connected to an engine, not shown, or a machine body to which the engine is mounted. The inclination sensor 15 is, for example, composed of a magnetic resisting element, a potentiometer, a lead switch or a mercury switch for transmitting a signal corresponding to the inclination angle or a signal generated at a time when the inclination of the engine is beyond a predetermined inclination angle.

A power source Vcc such as battery is connected to the input processing means 4 through a motor switch 16 and a power switch 17. The motor switch 16 is made "ON" after the power switch 17 has been made "ON".

An electrically driven fuel pump 18 (300 in FIG. 1) is connected to the driving circuit 12.

The operations of the respective means constituting the safety system against overturning according to the present invention shown in FIG. 2 will be described hereafter.

The waveform processing means 2 performs the waveform shaping of an alternating voltage wave generated on the primary side of the ignition coil into a rectangular wave.

The sensor signal processing means 3 has a timer function or a delay function to prevent generation of a false signal due to the road condition because inclination sensor 15 is sensitively reactive to an instantaneous operation.

The input signal processing means 4 converts a signal inputted at a time when the power switch 17 and the motor switch 16 are made "ON" into an inner processing signal, i.e. a forced driving signal.

In a case where the inclination sensor 15 is of the type having a magnetic resisting element or potentiometer which generates an output corresponding to the inclination angle of the engine, the self-hold means 5 compares a signal representing the inclination angle generated from the sensor signal processing means 3 with a preliminarily set allowable inclination angle. And in a case where the inclination angle exceeds the allowable inclination angle, the self-hold means 5 transmits an engine stopping signal and self-holds or maintains the output condition of the engine stopping signal.

On the other hand, in a case where the inclination sensor 15 is of the type having the lead switch or the mercury switch which generates an output signal when the inclination angle exceeds the predetermined allowable inclination angle, the self-hold means 5 outputs an engine stopping signal in response to the signal from the sensor signal processing means 3 and to self-hold or maintain the output condition of the engine stopping signal.

The engine stopping means 6 is connected between the primary side of the ignition coil in the ignition unit 13 and the waveform processing means 2 to short circuit the primary side of the ignition coil and to extinguish the ignition plug 14 when the engine stopping signal is transmitted from the self-hold means 5. The engine stopping means 6 may be composed of a breakless circuit utilizing thyristor or transistor means, or relay switch means.

The pulse count processing means 7 count the signals generated from the waveform processing means 2 and calculate or index the engine speed. In a case where the engine stopping signal is outputted from the self-hold means 5, the signal counting is stopped or the output signal from the waveform processing means 2 is made "0". The pulse count processing means 7 may be composed of an F/V converting circuit or a pulse rate circuit.

The reference value generating means 8 generates a signal representing the reference value corresponding to a preliminarily set engine speed for determining an initial combustion step in the engine cycle.

The comparing means 9 compares the engine speed indexed by the pulse count processing means 7 with the reference value generated from the reference value generating means 8. The comparing means 9 transmits a pump driving signal when the engine speed is above the reference value while transmitting a pump stopping signal when the engine speed is below the reference value.

The forced driving condition determining means 10 transmits a pump stopping signal irrespective of the transmission of the forced driving signal from the input processing means 4 in a case where the engine stopping signal is transmitted from the self-hold means 5. The forced driving condition determining means 10 also transmit a pump driving signal in a case where the engine stopping signal is not transmitted from the self-hold means 5 and where the forced driving signal is transmitted from the input processing means 4, i.e. where the motor switch 16 is switched "ON" to drive the motor.

The driving condition determining means 11 serves in response to the control signal from the forced driving condition determining means 10 irrespective of the output signal from the comparing means 9 in a case where the control signal is transmitted from the forced driving condition determining means 10, whereas the driving condition determining means 11 is operated in response to the control signal from the comparing means 9 in a case where the control signal is not transmitted from the forced drying condition determining means 10.

That is, in a case where the pump driving signal is transmitted from the forced driving condition determining means 10 or where the control signal is not transmitted from the forced driving condition determining means 10 and the pump driving signal is transmitted from the comparing means 9, the driving condition determining means 11 generates a pump driving signal. In contrast, in a case where the pump stopping signal is transmitted from the forced driving condition determining means 10 or where the forced driving signal is not transmitted from the forced driving condition determining means 10 and the pump stopping signal is transmitted from the comparing means 9, a pump stopping signal is generated from the driving condition determining means 11.

The driving circuit 12 outputs a driving signal or stopping signal to the fuel pump 18 in response to the output signal from the driving condition determining means 11.

In FIG. 2, reference numeral 19 designates a manual stop switch.

The first embodiment of the present invention of the construction or character described above will operate as follows.

At the initial engine starting time, when the power switch 17 is made "ON" and the motor switch 16 is then made "ON", the forced driving signal is outputted from the input processing means 4 to the forced driving condition determining means 10.

In the meantime, when the engine is started at the location on a flat ground, the engine stopping signal is not generated from the self-hold means 5 and, hence, the pump driving signal is transmitted from the forced driving condition determining means 10 to the driving circuit 12 through the driving condition determining means 11. The fuel pump 18 is then forcibly driven by the operation of the driving circuit 12.

After the starting of the engine, when the motor switch 16 is switched to "OFF", the output of the forced driving signal from the input processing means 4 is stopped and the output of the control signal from the forced driving condition determining means 10 is stopped.

Then, after the initial combustion step of the engine has been completed, when the engine speed calculated by the pulse count processing means 7 exceeds the reference value(reference engine speed for determining the initial combustion step) from the reference value generation means 8, the pump driving signal is transmitted from the comparing means 9 to the driving condition determining means 11, thereby driving the fuel pump 18.

Accordingly, the fuel pump 18 can be driven continuously even in the "OFF" condition of the motor switch 16.

When the inclination of a machine body equipped with the engine is beyond the allowable inclination angle the engine operation stopping signals are transmitted to the engine stopping means 6, the pulse count processing means 7 and the forced driving condition determining means 10 from the self-hold means 5 into which the output signal from the inclination sensor 15 is inputted through the sensor signal processing means 3. The self-hold means 5 holds the output condition of the engine stopping signal.

At this moment, the primary side of the ignition coil in ignition unit 13 is short-circuited by the engine stopping means 6 and the ignition plug 14 is extinguished.

A false signal having an appearance value of "0" of the engine speed is then transmitted from the pulse count processing means 7 to the comparing means 9, from which the pump stopping signal is transmitted to the driving condition determining means 11.

The pump stopping signal is also transmitted from the forced driving condition determining means 10 to the driving condition determining means 11. The pump stopping signal is then transmitted from the driving condition determining means 11 to the fuel pump 18 through the driving circuit 12, thus immediately stopping the operation of the fuel pump 18.

As described hereinabove with reference to the first embodiment of the present invention, when the inclination of the machine body exceeds the allowable inclination angle, the primary side of the ignition coil is grounded and the operation of the fuel pump 18 is immediately stopped. Therefore, the fuel pump 18 is not operated while the engine is rotated by the inertia and, hence, an adverse phenomenon such as over-flow of the fuel can be effectively prevented.

Moreover, as described above, in the engine overturning, since there is less time between the time when the inclination of the machine body exceeds the allowable inclination and the time when the machine body is actually overturned once, twice—on an inclined ground, the output value from the inclination sensor 15 repeatedly indicates the overturned condition and the normal condition. However, since the self-hold means 5 can hold the output condition of the engine stopping signal, the engine is not erroneously driven and the fuel pump is not also erroneously operated.

Furthermore, in the overturned condition of the machine body, even if the motor switch 16 is erroneously switched "ON", the fuel pump 18 is not erroneously driven because the engine stopping signal is inputted into the forced driving condition determining means 10 from the self-hold means 5.

In a case where wire breaking of a the wiring of the manually operative stop switch 19 and the disconnection of the connector are caused, the fuel pump 18 is not operated in response to the engine stopping signal from the self-hold means 5, so that the fuel is never supplied and the engine can be surely stopped.

Since the calculation of the engine speed by the pulse count processing means 7 is performed in response to the output signal from the ignition unit 13, the engine speed calculated by the pulse count processing means 7 is made "0" even in a case where the ignition coil in the ignition unit 13 is broken or damaged at an engine overturning time, for example, and the self-hold means 5 is broken. Thus, the driving of the fuel pump 18 stops.

The engine stopping signal transmitted from the self-hold means 5 can be held till the power switch 17 is once switched "OFF".

Consequently, as described above, any secondary disaster or damage caused by the overturning of the engine can be effectively avoided.

Figure 3:
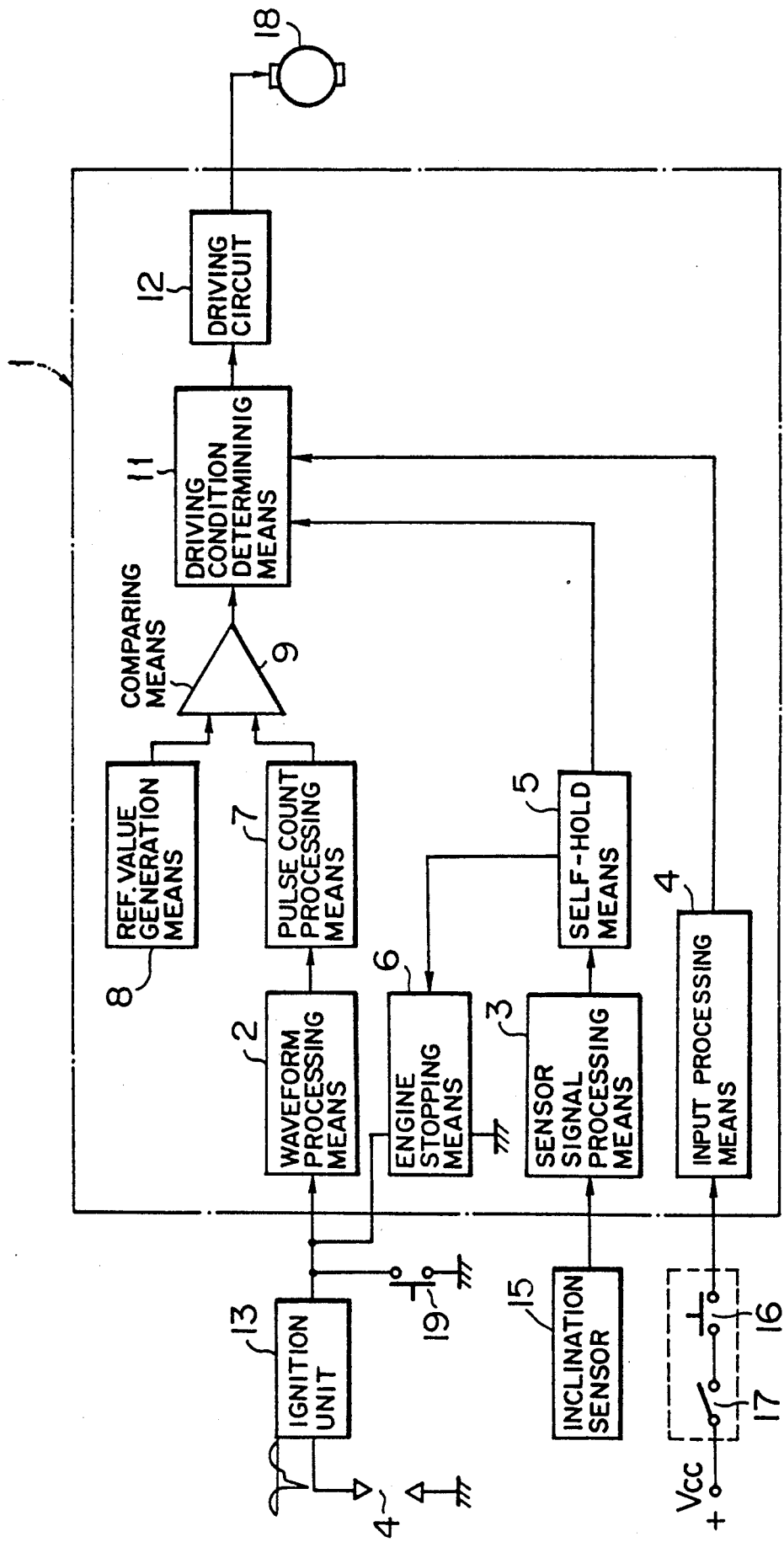
FIG. 3 is also a block diagram of a safety system against engine overturning according to the second embodiment of the present invention.

FIG. 3 is a block diagram representing the second embodiment of the safety system against engine overturning of the present invention.

As can be seen from the block diagram of FIG. 3, the second embodiment is one composed by simplifying the first embodiment, in which the driving condition of the fuel pump 18 is determined only by the driving condition determining means 11.

Referring to FIG. 3, in a case where the engine stopping signal is inputted into the driving condition determining means 11 from the self-hold means 5, the driving condition determining means 11 transmits the pump stopping signal into the driving circuit 12 irrespective of the signal inputted from the input processing means 4 and the comparing means 9.

In a case where the engine stopping signal is not transmitted from the self-hold means 5, the operation of the fuel pump 18 is controlled in response to the output signals from the input processing means 4 and the comparing means 9.

While the presently preferred embodiments of the present invention have been shown and described, it is to be understood that these disclosures are for the purpose of illustration and that various changes and modifications may be made without departing from the scope of the invention as set forth in the appended claims.

For example, a unit for detecting wire breaking and imperfect contact of the inclination sensor 15 may be incorporated in the control unit 1 of the safety system of the present invention.

What is claimed is:

1. A safety system for overturning of an engine with a fuel pump, comprising:
    inclination detecting means for detecting an engine inclination and for transmitting an inclination signal;
    self-hold means responsive to the inclination signal for determining an inclined condition of the engine and for producing an engine stopping signal when the inclination exceeds a preliminarily set allowable inclination;
    engine stopping means responsive to the engine stopping signal for inactivating an ignition of the engine to forcefully stop the engine;
    driving condition determining means responsive to the engine stopping signal for stopping an operation of the fuel pump to prevent fuel from being supplied to the engine; and said self-hold means continuing to produce an engine stopping signal until turning off a power switch of the engine.

2. The safety system according to claim 1, further comprising:
a motor switch actuated to start the operation of the engine;
input processing means for converting an output signal from the motor switch into a forced driving signal; and
said driving condition determining means responsive to the forced driving signal for driving the fuel pump unless the engine stopping signal is received.

3. The safety system according to claim 2, further comprising:
an ignition unit generating an alternating voltage to make an ignition plug spark;
waveform processing means for shaping a waveform of the alternating voltage into a rectangular waveform;
pulse count processing means response to the rectangular wave for calculating an engine speed;
reference value generation means for generating a reference value to determine an occurrence of an initial combustion of the engine;
comparing means for comparing the engine speed with the reference value and for producing a motor driving signal when the engine speed exceeds the reference value; and
said driving condition determining means responsive to the motor driving signal for driving the fuel pump unless the engine stopping signal is received.

4. The safety system according to claim 3, wherein said inclination detecting means is an inclination sensor generating the inclination signal corresponding to an inclination angle of the engine and the self-hold means serves to compare the inclination angle with a preliminarily set allowable inclination angle.

5. The safety system according to claim 3, wherein the inclination detecting means is an inclination sensor generating an output when the inclination exceeds the preliminarily set allowable inclination, and the self-hold means produces the engine stopping signal in response to the output from the inclination sensor.

6. The safety system according to claim 3, wherein said engine stopping means comprises a breakerless circuit including a thyristor or transistor.

7. The safety system according to claim 3, wherein said pulse count processing means includes an F/V converter or a pulse rate circuit.

8. The safety system according to claim 3, wherein said comparing means serves to output a pump stopping signal when the detected engine speed is less than the reference speed to stop the fuel pump.

9. The safety system according to claim 3, wherein said driving condition determining means includes a forced driving condition determining means which transmits a pump stopping signal irrespective of an output signal from said input processing means when the engine stopping signal is generated from said self-hold means and which transmits a pump driving signal when the engine stopping signal is not transmitted from the self-hold means and a forced driving signal is generated from the input processing means.

* * * * *